E. L. EVANS.
AUTO CARRIER.
APPLICATION FILED OCT. 30, 1918.
1,309,470.
Patented July 8, 1919.
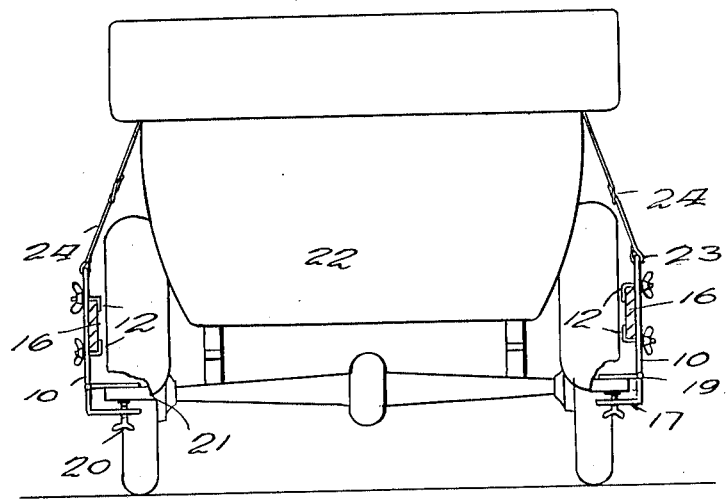
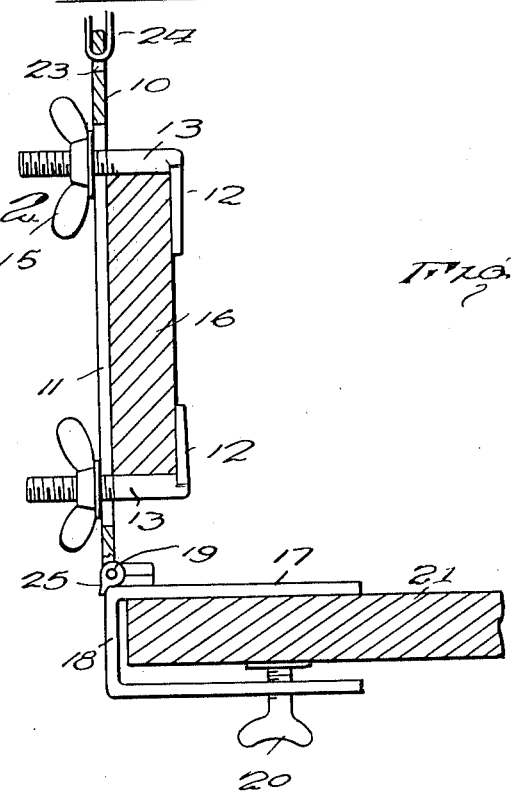
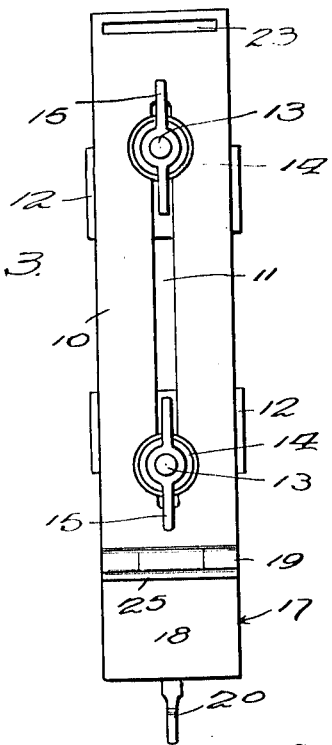
E. L. Evans Inventor
By Geo. P. Kimmel
Attorney

UNITED STATES PATENT OFFICE.

EDWARD L. EVANS, OF JEWETT, TEXAS.

AUTO-CARRIER.

1,309,470.  Specification of Letters Patent.  Patented July 8, 1919.

Application filed October 30, 1918. Serial No. 260,352.

*To all whom it may concern:*

Be it known that I, EDWARD L. EVANS, a citizen of the United States, residing at Jewett, in the county of Leon and State of Texas, have invented certain new and useful Improvements in Auto-Carriers, of which the following is a specification.

This invention relates to an improved attachment for automobiles, and more particularly to a carrier designed to be applied to the running board, for carrying various luggage, such as cases, grips, trunks or the like, with convenience and facility, and to permit the removal thereof as desired.

A further object of the invention is to provide a device which is simple in construction, strong and durable and capable of economical production, and which embodies a clamp designed to be quickly applied to the running board and having means to support objects thereon, and to brace said carrier so as to withstand considerable weight.

With the above and other objects in view, my invention comprises the novel features of construction, combinations of elements and arrangement of parts which will be more fully described in the following specification and then finally embodied in the clauses of the claims which are appended hereto and which form an essential part of the same.

Reference is had to the accompanying drawings forming a part of this application, wherein similar reference characters will refer to corresponding parts throughout the several views, in which—

Figure 1 is a rear elevation of an automobile showing my improved auto carrier applied thereto at opposite sides to the running boards.

Fig. 2 is an enlarged sectional edge elevation of the device, and

Fig. 3 is a face view of the device.

Referring to the drawings in detail, my improved auto carrier includes a vertical section 10 having a longitudinal slot 11 intermediately of the side edges thereof and extending throughout a greater portion of the length thereof. Engaged in the slot 11 are clamps 12 having screw shanks 13 disposed at right angles thereto and extended through the slot 11, washers 14 and wing nuts 15 being engaged on said threaded shanks, so as to clamp an object between the jaws of the clamps 12 and the vertical section or strip 10 forming the body of the carrier. In the form shown, the clamps 12 are in the form of plates having the shanks 13 coextensive with one edge and at right angles thereto, the plates or jaws extending toward each other in opposite directions for receiving a retaining member as indicated at 16, such as a plank, board, steel bar or the like therebetween, so as to be held in position and against vibration or displacement when the automobile or other vehicle to which the device is applied, is traveling. The retaining members 16 extend from the front to the rear portions of the fenders, on the inside and are designed to retain on the running boards between the retaining members, baggage, grips, etc., and securely hold the same from displacement, while the clamps will serve to carry an article such as the plank, board, steel bar or the like as described, whether such plank or the like be used as a retaining means for the baggage or not.

Hinged to the lower end of the section 10 is a U-shaped clamp 17, the same comprising vertically spaced parallel jaws having an end wall 18 to which the lower end of the section 10 is hinged as shown at 19, so as to fold inwardly upon the clamp but be held from outward movement beyond the vertical position as shown in the drawings. A clamping screw 20 is engaged through the lower portion of the U-shaped clamp 17, so as to engage the running board or the like 21 and thereby securely attach the device to the automobile or other vehicle. The devices are preferably adapted to be sold and employed in pairs at one or both sides of the automobile generally indicated by the numeral 22 and if desired, the upper ends of the sections or strips 10 may be provided with a slot 23 designed to receive a strap 24 of adjustable type, for connecting the upper end of the carrier to the body or other part of the automobile, in order to withstand considerable more strain than would be possible by reason of the shoulder 25 at the lower end of the section 10 engaging the portion 18 or upper jaw of the U-shaped clamp 17. Also, the part 18 may be described as being the lower part of the section 10 from which the spaced parallel jaws forming the clamp 17 extend, the device also permitting the carrying of articles between the plank or the like 16 and the side of the body of the car, and retaining the same against displacement or loss.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new, and desire to secure by Letters Patent, is:

1. An auto carrier comprising a vertical strip having a slot running vertically therein, a slot in the upper end of said strip designed to receive an attaching strap, clamps comprising jaws having threaded shanks movable in said slot, binding means engaged on said shanks, a U-shaped clamp member hinged to the lower end of said strip and a clamping screw engaged through the lower jaw of said clamping member.

2. An automobile carrier including horizontal substantially U-shaped clamps, strips hinged to said clamps and adapted to be normally arranged at right angles thereto and having longitudinal slots formed therein, clamping members movable in said slots, a retaining member engaged by said clamping members and supported on the hinged strips, and means for connecting the free ends of said hinged strips to the body of the automobile.

In testimony whereof, I affix my signature hereto.

EDWARD L. EVANS.